us007555777B2

(12) United States Patent
Swimmer et al.

(10) Patent No.: US 7,555,777 B2
(45) Date of Patent: Jun. 30, 2009

(54) PREVENTING ATTACKS IN A DATA PROCESSING SYSTEM

(75) Inventors: Morton D. Swimmer, Waedenswil (CH); Andreas Wespi, Niederhasli (CH); Diego M. Zamboni, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 10/756,744

(22) Filed: Jan. 13, 2004

(65) Prior Publication Data

US 2004/0255163 A1 Dec. 16, 2004

(51) Int. Cl.
*G06F 11/30* (2006.01)
(52) U.S. Cl. ....................................................... 726/23
(58) Field of Classification Search ..................... 726/23
See application file for complete search history.

(56) References Cited

U.S. PATENT DOCUMENTS

| 6,016,546 | A * | 1/2000 | Kephart et al. ................. 726/24 |
| 6,374,241 | B1 * | 4/2002 | Lamburt et al. ................ 707/6 |
| 6,735,703 | B1 * | 5/2004 | Kilpatrick et al. .............. 726/23 |
| 7,043,757 | B2 * | 5/2006 | Hoefelmeyer et al. .......... 726/24 |
| 7,093,239 | B1 * | 8/2006 | van der Made .............. 717/135 |
| 7,260,725 | B2 * | 8/2007 | Carmona et al. ............. 713/187 |
| 2003/0014667 | A1 * | 1/2003 | Kolichtchak ................. 713/201 |
| 2005/0022018 | A1 * | 1/2005 | Szor ........................... 713/201 |
| 2007/0058551 | A1 * | 3/2007 | Brusotti et al. .............. 370/241 |

* cited by examiner

*Primary Examiner*—Benjamin E Lanier
*Assistant Examiner*—Devin Almeida
(74) *Attorney, Agent, or Firm*—Stephen C. Kaufman; Anne Vachon Dougherty (57) ABSTRACT

A method and apparatus for facilitating reduction in successful attacks on a monitored data processing system, such as a host computer. An intrusion detection system comprises a host or application based sensor for detecting code based intrusions with a relatively low false-positive rate. Malicious code strings related to a detected intrusion are identified, extracted and forwarded to a pattern filter located in the monitored data processing system to prevent further intrusions using said malicious code strings. The malicious code strings may be forwarded to a response server for assembling sets of similar malicious code strings for which signatures are generated to permit identification of all malicious code strings contained in a set. The generated signatures are then distributed to monitored and/or monitoring systems of a protected network to prevent further intrusions using the malicious code strings and variations thereof.

7 Claims, 5 Drawing Sheets

PREVENTING ATTACKS IN A DATA PROCESSING SYSTEM

FIELD OF THE INVENTION

The present invention generally relates to preventing attacks in a data processing system, such as a host computer or a computer network and specifically relates to a method, computer program element, and apparatus for preventing attacks on a monitored data processing system such as buffer overflow attacks.

BACKGROUND OF THE INVENTION

According to an article by Kathleen A. Jackson, INTRUSION DETECTION SYSTEM (IDS) PRODUCT SURVEY, Version 2.1, Los Alamos National Laboratory 1999, Publication No. LA-UR-99-3883, Chapter 1.2, IDS OVERVIEW, intrusion detection systems typically attempt to detect computer misuse. Misuse is the performance of an action that is not desired by the system owner such as one that does not conform to the system's acceptable use and/or security policy. Typically, misuses take advantage of one or more of the following: vulnerabilities attributed to system misconfiguration; inadequately engineered software; user neglect or abuse of privileges; and, to basic design flaws in protocols and operating systems.

Intrusion detection systems typically analyse activities of internal and/or external users for explicitly forbidden and anomalous behaviour. They are usually based on the assumption that misuse can be detected by monitoring and analysing network traffic, system audit records, system configuration files or other data sources. See for example, the article by Dorothy E. Denning, IEEE TRANSACTIONS ON SOFTWARE ENGINEERING, VOL. SE-13, NO. 2, February 1987, pages 222-232.

Available methods for detecting misuse by an intrusion detection system vary. Two intrusion detection methods are typically employed. These are described for example in European patent application number EP 0 985 995 A1 and in U.S. Pat. No. 5,278,901.

The first method uses knowledge accumulated about attacks and looks for evidence of their exploitation. This method, which, on a basic level, can be compared to virus checking methods, is referred to as knowledge-based (also known as signature-based or pattern-oriented). A knowledge-based intrusion detection system therefore looks for patterns of attacks while monitoring a given data source. As a consequence, attacks for which signatures or patterns are not stored, will not be detected.

In the second method, a reference model is built. The model represents the normal behaviour or profile of the system being monitored and looks for anomalous behaviour, such as deviations from the previously established reference model. Reference models can be built in various ways. For example, in the article by S. Forrest, S. A. Hofmeyr, A. Somayaji and T. A. Longstaff, entitled "A Sense of Self for Unix Processes", Proceedings of the 1996 IEEE Symposium on Research in Security and Privacy, IEEE Computer Society Press 1996, pages 120-128, normal process behaviour is modelled by short sequences of system calls. The second method is therefore generally referred to as behaviour-based, but also known as profile-based or anomaly-based. Behaviour-based intrusion detection, which assumes that the "behaviour" of a system will change in the event that an attack is carried out, therefore allows detection of previously unknown attacks, as long as they deviate from the previously established model of normal behaviour. Provided that the normal behaviour of the monitored system does not change, a behaviour-based intrusion detection system will remain up to date without having to collect signatures of new attacks.

However, precisely distinguishing "self" from potentially dangerous "others" (or "non-self") and eliminating "others" is not easily accomplished, see, for example, the article by S. Forrest, S. A. Hofmeyr and A. Somayaji; Computer Immunology, University of N. Mex., Communications of the ACM, Mar. 21, 1996, page 3.

The behaviour of a system normally changes over time. The changes may be due to, for example, changes in activities of authorised users or installation of new or updated system elements. Thus, without immediate adaptation of the reference model, deviations from modelled behaviour will frequently be detected without any intrusions taking place. Behaviour-based intrusion detection systems therefore normally produce a higher number of false alarms or "false positives" deriving from non-threatening events.

In general, the designer of an intrusion detection system navigates between endangering the system with a flood of false alarms and jeopardising the monitored system with new attacks. As herein before described, conventional intrusion detection systems detect, but do not prevent, attacks. Intrusion detection does not therefore typically offer a complete security solution alone. An intrusion detection system, as one of several measures usually employed to protect an enterprise, typically delivers information contained in numerous alarm messages. These alarm messages are analysed to implement countermeasures against attacking systems. However, the analysis of the received alarm messages typically involves considerable processing effort and also incurs undesirable response delays.

Accordingly, it would be desirable to provide an improved method, a computer program element and a system for preventing intrusions into a monitored system such as a host computer.

In particular, it would desirable to provide a method and a system for efficiently utilising information provided by a behaviour based intrusion detection system to prevent further attacks, in particular buffer overflow attacks, using the same or different malicious codes.

Further, it would be desirable to provide a method and a system for preventing intrusions into a monitored system while practically avoiding the generation of potentially disturbing false alarms.

Still further, it would be desirable to provide a method and system that protect the monitored and further systems of a related network practically without delay against detected attacks.

SUMMARY OF THE INVENTION

In accordance with the present invention, there is now provided a method for preventing attacks in a monitored data processing system, the method comprising: identifying a malicious code string related to a detected intrusion; extracting the malicious code string; and, forwarding the malicious code string to an intrusion limitation subsystem to reduce further intrusions based on the malicious code string.

The intrusion limitation subsystem may comprise a pattern filter in the monitored system to reduce further intrusions based on the malicious code string. Additionally, or alternatively, the intrusion limitation subsystem may comprise a response server for distributing the malicious code string to one or more connected systems to reduce further intrusions into such connected systems based on the malicious code string. The connected systems may comprise one or more connected monitored systems. Additionally or alternatively, the connected systems may comprise one or more connected monitoring systems.

The method preferably further comprises: monitoring, via a sensor, system calls from a daemon executed in a memory of the monitored data processing system; and, matching the system calls with one or more of established patterns and rules contained in a pattern matcher and representing a model of normal behaviour.

The matching of the system calls preferably comprises establishing a non-deterministic automaton based on an analysis of executable code of the daemon. Preferably, the method further comprises intercepting the system call via a subprogram of the sensor for observing the interaction of the daemon and the operating system. In a particularly preferred embodiment of the present invention to e described shortly, the method additionally comprises inspecting a stack on the detection of an intrusion to retrieve an address leading to the malicious code string. On detection of an intrusion, the method preferably comprises: locating, as a first element on the stack, a return address of a system call entry code from which the subprogram departed; and, retrieving a return address of the malicious code string pointing to a memory location in the range in which the daemon is executed from a second element on the stack positioned at or near the location of the return address of the system call entry code to facilitate finding and extracting of the malicious code string. Preferably, the method comprises: scanning the memory range owned by the executed daemon starting from the return address in opposite directions until on one side a first region with a plurality of similar addresses and on the other side a second region with a plurality of similar instructions that do not alter the sequential control flow is identified; and, extracting the malicious code string from between the first and second regions.

In a preferred embodiment of the present invention, the method comprises: storing each extracted malicious code string in a database of the response server; correlating the stored malicious code strings to find sets of malicious code strings; and, for each set, generating a signature that allows the individual identification of all malicious code strings contained in the corresponding set. The correlating step preferably comprises utilising an edit-distance algorithm. Preferably, the sets have mutual edit distances smaller than a given threshold distance.

Viewing the present invention from another aspect, there is now provided a computer program element comprising computer program code means which, when loaded in a processor of a data processing system, configures the processor to perform a method as herein before described.

Viewing the present invention from yet another aspect, there is now provided apparatus for preventing attacks in a monitored data processing system, the method comprising: a code extractor for identifying and extracting a malicious code string associated with a detected intrusion; and, an intrusion limitation subsystem for reducing further intrusions based on the malicious code string on receipt of the malicious code string from the code extractor.

The apparatus preferably comprises a sensor for monitoring system calls sent to an operating system to detect code based intrusions.

The intrusion limitation subsystem preferably comprises a pattern filter connected to the code extractor for receiving extracted malicious code strings and for identifying patterns within a processed data stream that match the extracted code strings to prevent further intrusions based on the malicious code strings. Additionally, or alternatively, the intrusion limitation system may comprise a response server having: a database for receiving extracted malicious code strings from the code extractor; a correlator connected to the database for assembling sets of code strings having mutual edit distances less than a given threshold distance; a sequencer connected to the database for generating a signature for each set, the signature facilitating identification of all malicious code strings contained in the corresponding set; and a distributor connected to the database for distributing, new signatures to connected systems.

An example of the present invention seeks to prevent attacks in a monitored system, such as a host computer, via a behaviour-based intrusion detection system comprising a host or application based sensor that detects code-based intrusions with a very low false-positive rate. In a preferred embodiment of the present invention, a malicious code string related to a detected intrusion is identified, extracted, and forwarded to a pattern filter located in the monitored system in the interests of preventing further intrusions using the malicious code string. Additionally or alternatively, the malicious code string may be forwarded to a response server for further processing and distribution to plural monitored and/or monitoring systems, also in the interests of preventing further intrusions based on the malicious code string.

In a particularly preferred embodiment of the present invention, the sensor is adapted to: intercept system calls that are forwarded to an operating system from at least one daemon or similar program executed from a user-mode memory of a monitored host computer; and to match a stream of system calls with assembled patterns and/or rules contained in a pattern matcher and representing a model of normal behaviour.

To obtain a reduced false positive rate, the rules and/or patterns for the model of normal behaviour are preferably matched by a non-deterministic automaton based on the analysis of the executable code of the daemon.

On detection of an intrusion, the return address, pointing to a memory location in the range in which the daemon is executed, is located and the corresponding malicious code string responsible for initiating the system call is extracted.

To extract a malicious code string introduced via a buffer overflow attack, the memory range containing the executed daemon is preferably scanned in opposite directions starting from the located return address until on one side a first region with a plurality of addresses and on the other side a second region with a plurality of instructions that do not perform an operation are found, so that the malicious code string residing between the first and second regions can be extracted.

In a particularly preferred embodiment of the present invention, extracted malicious code strings forwarded to a database of the response server are correlated to find sets with similar malicious code strings that have mutual edit distances smaller than a given threshold distance. For each of these sets, a signature is preferably generated to permit individual identification of all malicious code strings contained in the corresponding set.

Preferably, only signatures proven to have a relatively low probability to cause false alarms are accepted.

Either periodically or when available, new signatures may then be distributed to monitored systems and/or network security devices connected to the response server.

Examples of the present invention offer improvement not only in the "sense of self" of a protected system but also in the "sense of other" thus providing improved protection while maintaining the rate of false positives and the rate of false negatives at a reduced level.

In a preferred embodiment of the present invention, for the behaviour based intrusion detection sensor implemented in the monitored system, a model of normal behaviour is established that causes fewer false alarms. Based on results provided by the intrusion detection sensor, a knowledge base can be accumulated covering attacking code strings that were previously detected and extracted and, in addition, similarly malicious code strings that are based on the same principle of attack. The generalisation process performed in the response server facilitates the generated signatures covering all malicious code strings contained in a corresponding set and a multitude of variations thereof while avoiding an increase in false alarms.

In an especially preferred embodiment of the present invention, instead of the malicious code strings as originally extracted, only the generated signatures, which are comparably small in number, are stored in a knowledge base such as a pattern filter associated with the monitored hosts. The signatures provide enhanced coverage of malicious code strings while occupying a reduced memory space and allowing performance of the detection or scanning process in a shorter time. The efficiency of the knowledge base is thus improved.

BRIEF DESCRIPTION OF THE DRAWINGS

Preferred embodiments of the present invention will now be described, by way of example only, with reference to the accompanying drawings, in which.

DETAILED DESCRIPTION OF THE INVENTION

Figure 1:
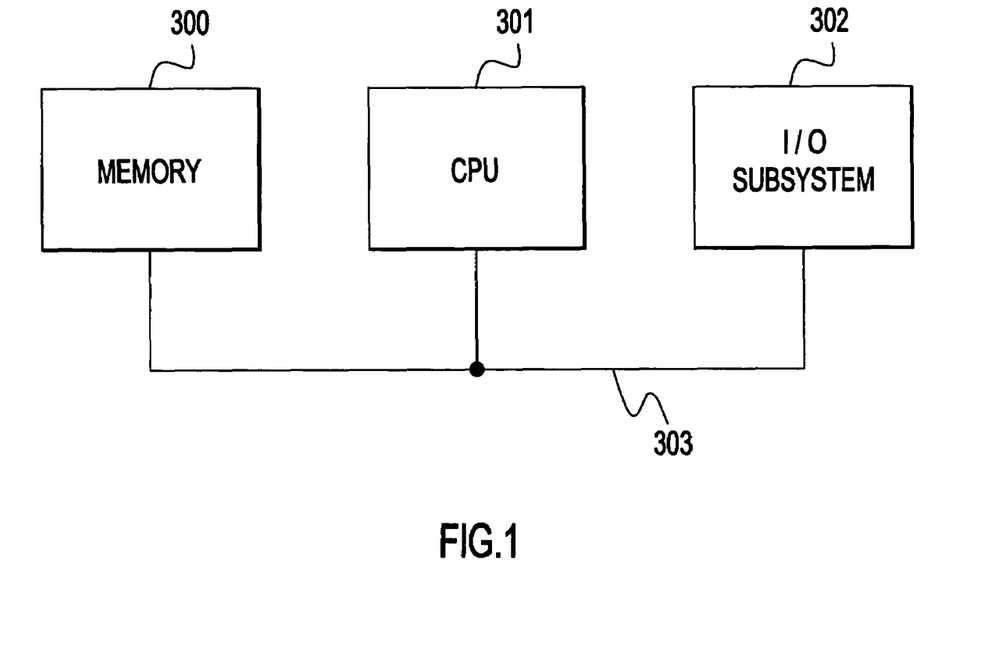
FIG. 1 is a block diagram of computer system.

Referring first to FIG. 1, a computer system in which embodiments of the present invention may be at least partially implemented includes a memory subsystem 300, a central processing unit (CPU) 301, and an input/output (I/O) subsystem 302, all interconnected via a bus subsystem 303. The memory subsystem 300 may comprise random access memory, read only memory, one or more mass storage devices such as magnetic or optical disk drives, or combinations thereof. The I/O subsystem 302 comprises at least one user input device such as a keyboard, mouse, or the like, at least one user output device such as a display, and at least one network interface device connecting the computer system to a data communications network. In operation, the CPU 301 executes computer program code stored in the memory subsystem 300.

Figure 2:
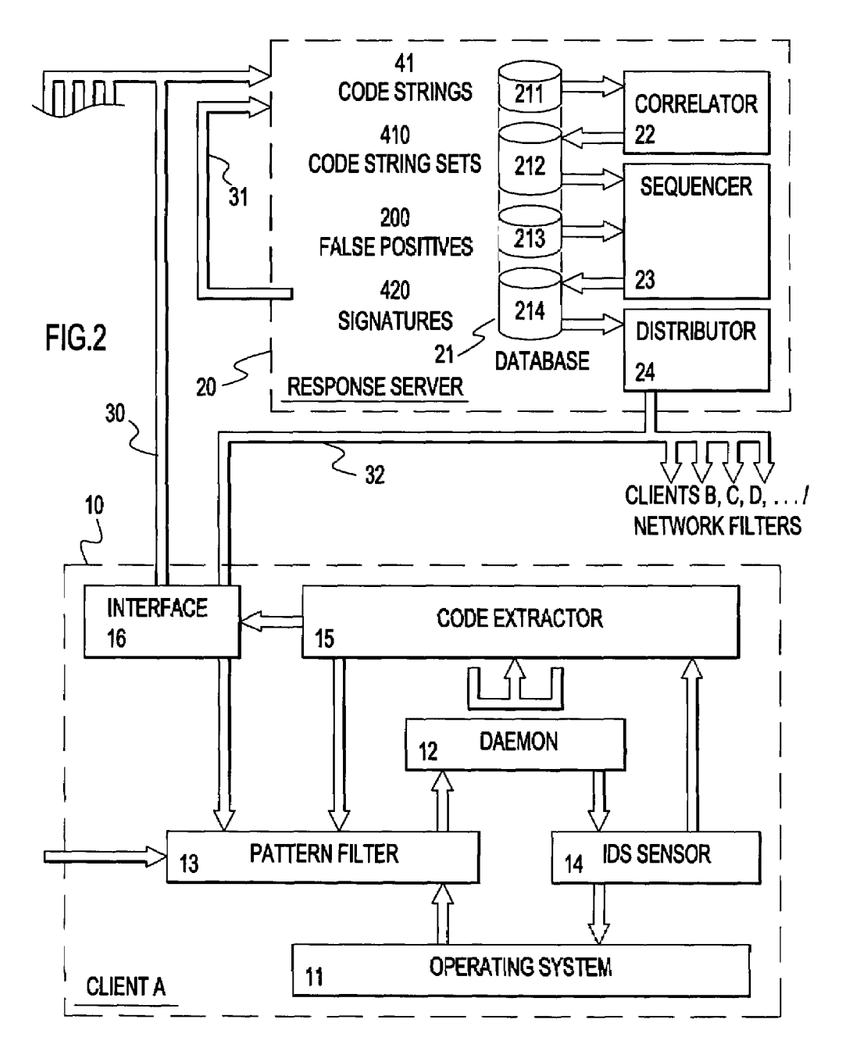
FIG. 2 is a block diagram of a preferred embodiment of the present invention in which a monitored host computer 10 is connected to a response server 20.

Referring now to FIG. 2 in a preferred embodiment of the present invention, there is provided a host computer 10 of the form herein before described with reference to FIG. 1. In operation, computer program code stored in the memory 300 of the host computer 10 and executed by the CPU 301 of the host computer 10 defines a logical system with the host computer 10. The logical system in the host computer 10 comprises an interface 16, a code extractor 15, a daemon 12, a pattern filter 13, an operating system 11, and an intrusion detection sensor 14.

Referring to FIGS. 2, 3, 4, and 5 together, in operation, the intrusion detection sensor 14 monitors system calls 44, 440 from a user-mode program such as the daemon 12 executed in a user-mode memory 51 of the host computer 10 and forwarded to the operating system 11. The system calls 44 are of a benign nature and the system calls 440 are initiated by malicious code.

As described in the white paper entitled "System Call Interception", Entercept Security Technologies 2001, modern operating system architectures separate code executed by users, often called shellcode, from code executed by the operating system 11 to protect the core or kernel of the operating system 11 from damage caused by errant or malicious programs. To achieve this, modern processors include a mode bit that specifies whether the processor is executing kernel-mode code or user-mode code. If the mode bit is set, meaning user-code is executing, then the processor prevents all access to kernel memory spaces such as the memory spaces 52, 53. However, because daemons utilise functionality provided by the operating system 11 to access disk drive drivers 305, network connection drivers 306, other drivers 307, and the like, those programs utilise system calls, that expose relevant functionality of the operating system 11 to user-mode programs. A daemon 12 compromised by an attacker does not therefore cause much harm unless it interacts with the operating system 11. Monitoring system calls 44; 440 is therefore an efficient approach to detect and prevent harmful activities in a computer system.

In general, there are different entry points that a daemon may use to access the operating system 11. For example, referring to FIG. 2, in the operating system 11, individual system call functions may be assigned in a system call table 18 to a kernel function address, so that the daemon 12 can indirectly access the operating system 11 by means of system calls 44 that can be easily intercepted and examined. The host based sensor 14 preferably comprises a subprogram 142 for observing interaction between the daemon 12 and the operating system 11 at one or more of the entry points to intercept the system calls 44; 440. The stream of system calls 44; 440 is matched in the sensor 14 via the pattern matcher 141 against a model of normal or expected behaviour.

Figure 3:
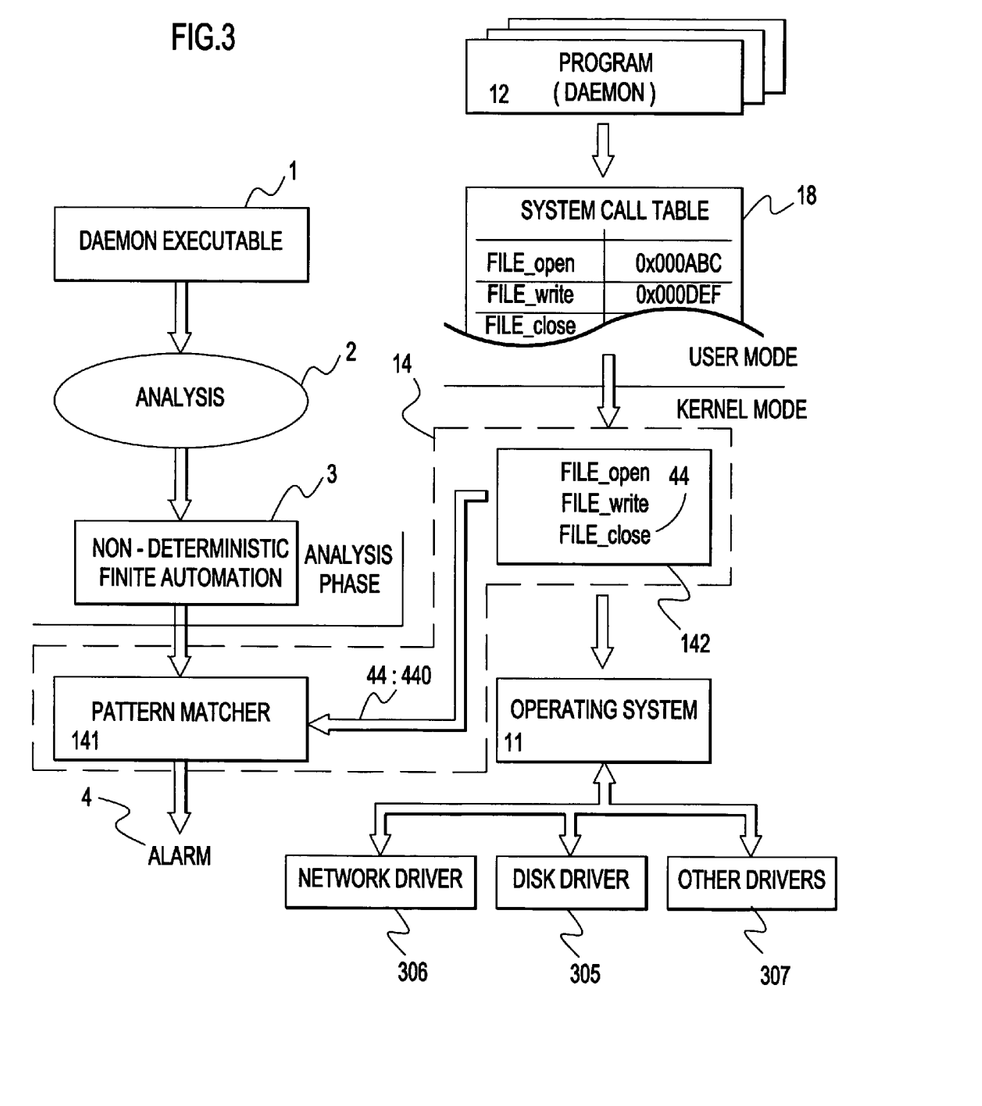
FIG. 3 is a flow diagram associated with a process for modelling normal behaviour of interactions between a daemon 12 and an operating system 11 executed in the host computer 10 producing patterns and rules stored in a pattern matcher 141 of a sensor 14 of an intrusion detection system for observing system calls 44; 440 sent from the daemon 12 to the operating system 11.

In a preferred embodiment of the invention, the rules and/or patterns for the model of normal behaviour are matched. Further details of such matching are provided by David Wagner and Drew Dean, in "Intrusion Detection via Static Analysis", Proceedings of the 2001 IEEE Symposium on Security and Privacy, May 2001, chapter 4.3. The matching is performed via a non-deterministic automaton 3 established on the basis of an analysis 2 of the executable code 1 of the daemon 12. In the Wagner, et al paper, it is proposed that static analysis of the source code of the daemon is used, along with a fixed model of the operating system 11 to model expected interactions of the daemon 12 with the operating system 11. Advantages of this approach include a high degree of automation and protection against a broad class of attacks based on malicious code. In preferred embodiments of the present invention, the model is devised to minimise false alarms from the pattern matcher 141.

Figure 4:
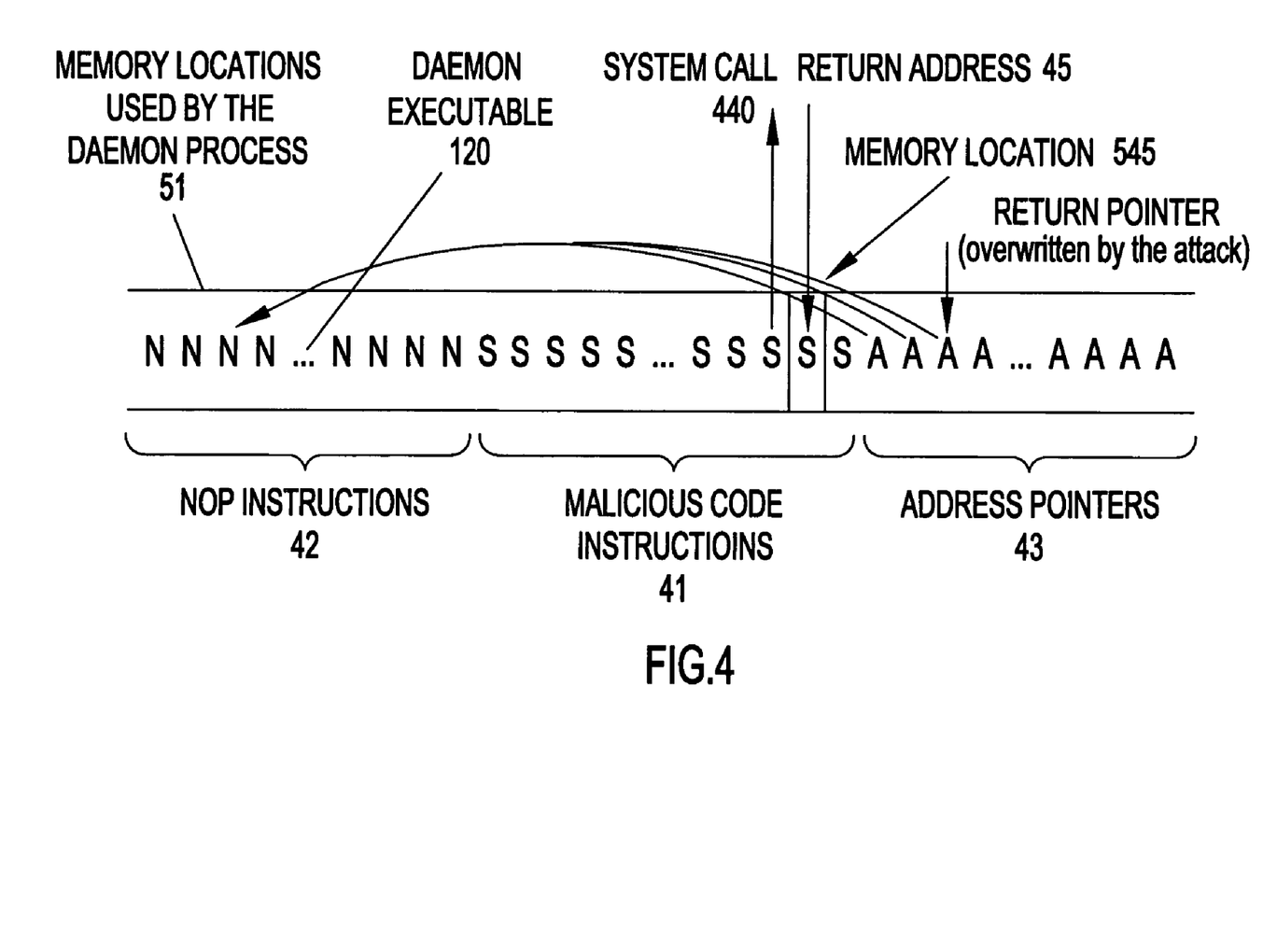
FIG. 4 is an example of a malicious code introduced by a buffer overflow attack into a memory region in which the daemon 12 is executed.

Referring to FIG. 2, in operation, the sensor 14 of the intrusion detection system intercepts system calls 44; 440 sent from the daemon 12 to the operating system 11. The sensor 14 is connected to a code extractor 15. With reference to FIG. 4, the code extractor 15, on detection of an intrusion, extracts the malicious code string 41 from the memory locations 51 of the compromised executable code 120 of the daemon 12.

Figures 5, 6:
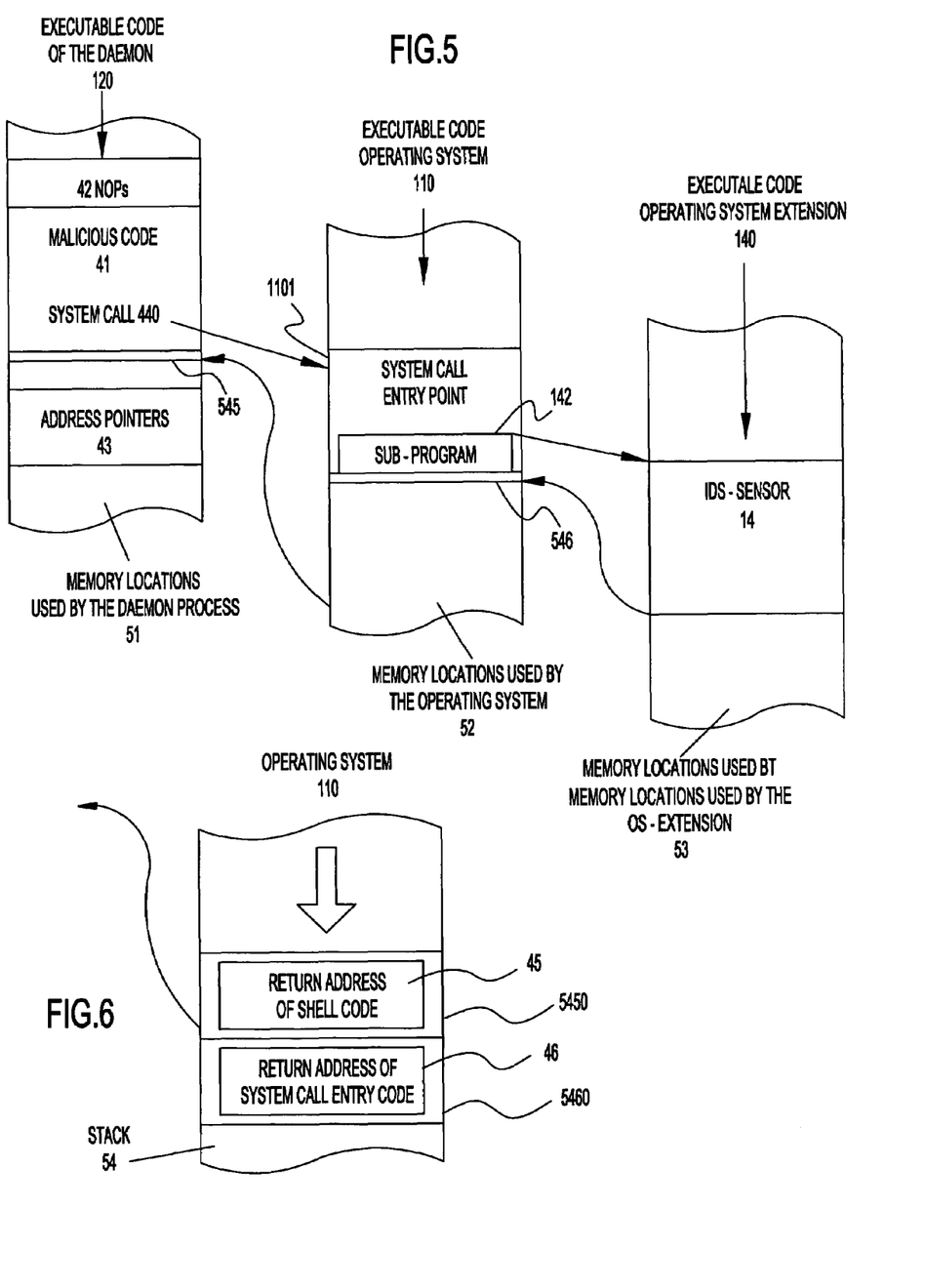
FIG. 5 is a block diagram of executable codes 120, 110, 140 of the daemon 12, the operating system 11, and the sensor 14 in memory sections 51, 52, 53 of the host computer 10 following interception of a system call 44; 440 by the sensor 14.
FIG. 6 shows a block diagram of a stack 54 of the host computer 10 following interception by the sensor 14 of a system call 440 initiated by a malicious code.

Referring to FIG. 5, shown therein is the layout, in a preferred embodiment of the present invention, of executable codes 120, 110, 140 of the daemon 12, the operating system 11 and the sensor 14 in memory sections 51, 52, 53 of the host computer 10 after a system call 44 has been intercepted by the subprogram 142 which subsequently called the sensor 14.

In preferred embodiments of the present invention, the sensor 14 is implemented as an extension of the operating system 11. The subprogram 142 is inserted at a point as close to the system call entry point 1101 of the operating system 11 as possible to call the sensor 14 whenever a system call 44 is executed.

When an attack from the executable code 120 of the daemon 12 is detected, the stack 54 of the host computer 10 is examined at this point to locate an address leading to the malicious code string 41 introduced by an attacker.

Referring to FIG. 6, shown therein is the top of the stack 54. The stack 54 is the region in which particular call return addresses, possibly local variables, and possibly call parameters are stored. Such stack elements grow downwards, containing the return address 45 of the system call 440 and possibly parameters and local variables. The return address 46 pointing back to the system call entry code from which the subprogram 142 departed is usually located as the first element on the stack 54, as shown at memory location 5460. The second element on the stack 54, shown at memory location 5450, contains the return address 45 which points to a memory location 545 in the memory range 51 owned by the malicious code string 41. This is utilised to locate and extract the malicious code string 41, as will be described shortly.

Malicious code strings 41 are frequently introduced and executed in an attacked system via buffer overflow attacks. Buffer overflow vulnerabilities are dominant in the field of remote network penetration vulnerabilities and allow an attacker to inject and execute malicious code. In general, the goal of a buffer overflow attack is to subvert the function of a privileged program so that the attacker can take control of that program. To achieve this goal, the attacker arranges for suitable code to be available in the program's address space and for the program to jump to that code with suitable parameters loaded into registers and memory. In a first step, the attacker provides a malicious code string containing instructions for the attacked machine as input to the program. The program in turn stores the malicious code string in a buffer. An overflow of a buffer is not required at this stage. However, to alter the program's control flow, a buffer is overflowed that has weak or non-existent bounds checking on its input with the goal of corrupting the state of an adjacent part of the program's state such as adjacent pointers. The programs that are attacked by this technique are usually privileged daemons, such as programs that run under the user-ID of root to perform some service. The injected attack code is usually a short sequence of instructions that spawns a shell, also under the user-ID of root, to give the attacker a shell with root's privileges. Further details are found in the following papers: a paper by Crispin Cowan, Perry Wagle, Calton Pu, Steve Beattie, and Jonathan Walpole, entitled "Buffer Overflows: Attack and Defense for the Vulnerability of the Decade", DARPA Information Survivability Conference and Expo (DISCEX), Hilton Head Island S.C., January 2000 and by Crispin Cowan, Calton Pu, Dave Maier, Heather Hinton, Jonathan Walpole, Peat Bakke, Steve Beattie, Aaron Grier, Perry Wagle, and Qian Zhang, the paper entitled "Automatic Adaptive Detection and Prevention of Buffer-Overflow Attacks", Proceedings of the 7th USENIX Security Conference, San Antonio, January 1998. The concept of buffer overflow attacks is therefore similar to the act of trojanisation of an executable code, except that write access to the program is not needed to modify it.

As described in the latter Cowan, et al paper, at chapter 2, engineering such a buffer overflow attack from scratch is not trivial. Often, the attacks are based on reverse-engineering the attacked program, so as to determine the exact offset from the vulnerable buffer to the return address to be overwritten in the stack frame and the offset from this return address to the injected attack code. However, these requirements can be softened as follows. The location of the return address can be approximated by simply repeating the desired return address several times in the approximate region of the return address. The offset to the attack code can be approximated by prepending the attack code with an arbitrary number of no-operation (NOP) instructions. Therefore, an attacker will usually append a buffer of repeated return addresses to the attack code. The repeated return addresses point into the region of prepended NOP-instructions which will be run through until the attack code is reached and run.

As mentioned in chapter 4.1 of that paper, it is difficult to obtain the exploit code for attacking programs. Most of the exploits are either obtained from searching the Web, or from dedicated mailing lists.

In a preferred embodiment of the present invention, a malicious code string 41 is extracted by the code extractor 15 from the memory range 51 owned by the compromised executable code 120 of the daemon 12 based on the corresponding return address 45 found on the stack 54 as described above. The extraction of the malicious code 41 is performed by scanning the memory range 51, preferably starting from the return address 45, in opposite directions, until on one side a first region 43 with a plurality of addresses and on the other side a second region 42 with a plurality of instructions is found that do not perform an operation. The malicious code string 41 residing between the regions 42, 43 can then be extracted.

Given that address pointers in the first region 43 need only point to one of the memory locations of the second region 42 and that the no-operation (NOP) instructions in the second region need only perform operations that do not alter the sequential control flow, then the return addresses or the NOP instructions need not be identical. In an especially preferred embodiment of the present invention, the scanned region of the executable code 120 of the daemon 12 is examined more closely to find identical or non-identical NOP instructions or addresses that match the given conditions.

The extracted malicious code string 41 may be used in several ways. Preferably, all of the options described in the following are taken to obtain a quick response to an immediate threat throughout the protected infrastructure.

Referring back to FIG. 1, to provide an immediate innate immune response, the extracted malicious code string 41 is passed to a pattern filter 13 located within the host computer 19. The pattern filter 13 scans input buffers to the daemon 12 for the patterns of received malicious code strings 41 to block buffers containing malicious code. This thereby prevents subsequent identical attacks from reaching the application. Also, this not only allows the detection of attacks but also provides an immediate immune response. Further information on scanning is provided in U.S. Pat. No. 5,452,442, column 1, lines 35-40.

Another option is to send the extracted malicious code strings 41 appropriately packed via the interface 16 and a communication channel 30 to an immune response server 20 that may serve a plurality of clients A, B, C, . . . or other security devices installed in the related network, such as network filters or knowledge-based intrusion detection systems.

The immune response server 20 preferably distributes the acquired malicious code strings 41 immediately to all its clients B, C, D, . . . , where the malicious code strings 41 are stored in a pattern filter identical or similar to the one of the discussed host computer 10, such as client A. Thus, an immediate immune response may be provided to all concerned elements of a protected network.

In a further embodiment of the present invention, the response server 20 stores the malicious code strings 41 received from its clients A, B, C, . . . in a database 21. Periodically or triggered by incoming data, the received malicious code strings 41 are retrieved from the corresponding section 211 of the database 20 and analysed by a correlator 22. The correlator 22 evaluates similarity between the malicious code strings 41 and assembles sets 410 containing similar malicious code strings 41 that differ in only a few positions.

Measuring similarity of strings is a basic problem in computer science, with applications in many fields such as computational biology, text processing, optical character recognition, image and signal processing, error correction, information retrieval, pattern recognition, and pattern matching in large databases. Typically, given two strings X and Y over a finite alphabet whose lengths are m and n respectively with $m \geq n$, sequences of weighted edit operations such as insertions, deletions, and substitutions of characters are considered by which X is transformed into Y. Calling such a sequence an edit sequence, then the ordinary edit distance problem (ED) seeks an edit sequence with minimum total weight over all edit sequences. The edit distance between the strings X and Y is a measure of similarity and is defined as the weight of such a sequence. Further information is provided in the paper by Abdullah N. Arslan, Omer Egecioglu, entitled "Efficient Algorithms For Normalized Edit Distance", *Journal of Discrete Algorithms* (Special Issue on Matching Patterns), Volume 1, No 1, p. 3-20, Hermes Science Publishing Ltd, Oxford, 2000. (ISBN 1-903398-07-X, ISSN 1468-0904).

The correlator 22 may thus use an edit distance algorithm for calculating similarity between the malicious code strings 41. Malicious code strings 41 with an edit distance smaller than a given threshold distance may be assembled in sets 410 which are then stored in section 212 of database 21. Preferably, the sets 410 are assembled in such a way that no overlap between them occurs.

Next, a sequencer 23 retrieves the assembled sets 410 from the database 21 and evaluates the individual malicious code strings 41 of each set 410 to determine a signature 420 that allows the detection of all malicious code strings 41 of the set 410 concerned.

It is desirable to carefully select the signatures 420 such that, when used in conjunction with the pattern filters 13 of the clients A, B, C, . . . , they are highly likely to discover the malicious code strings 41, if present, but seldom cause false alarms. The interest in achieving a lower false positive rate amounts to desiring that the signatures 420 be unlikely to appear in programs that are normally executed on the computer.

When malicious code is evaluated by a operator, the operator typically discards portions of the code having a reasonable likelihood of varying substantially from one instance to another. Then, one or more sections of the entity's code, which appear to be unlikely to appear in normal, legitimate programs, would be selected to produce the signatures. The expert may in particular consider sequences of instructions that appear to be typical for attacking code. However, the accelerating rate at which new malicious software, and new variations on previously-known malicious software, are appearing, has led to the development of automatic computer implemented procedures for extracting and evaluating signatures for the malicious software.

A statistical method and an apparatus for evaluating and automatically extracting signatures of malicious code strings is described in U.S. Pat. No. 5,452,442. Signatures provided by the described apparatus are highly unlikely to give rise to false positives and are sufficiently flexible to capture new variations of a previously-known malicious code. The proposed apparatus is robust to variations in the malicious code, allowing some variation of the code even within the portion of the malicious code that contains the signature. This is achieved by recognising byte strings that nearly, but not exactly, match a given signature. However, to prevent the generation of false positives, only a limited amount of mismatch between a malicious code string and a signature can be tolerated.

In a preferred embodiment of the present invention, malicious code strings 41 or at least a portion thereof are forwarded to the sequencer 23, with the or each portion preferably including a sequence of bytes of the malicious code string 41 that is likely to remain substantially invariant from one to another instance. Then from these portions, candidate signatures are drawn.

In a second step, a list of unique substrings from the sequence of bytes is constructed, each of the unique substrings comprising from one to a chosen maximal number of sequential bytes.

In a third step, for each of the unique substrings, a probability is estimated of an occurrence of a unique substring within further sequences of bytes that are typically executed in the relevant section of the host computer 10 and that, if incorporated in the signature 420, would cause false positives. These further sequences of bytes, which are stored in and retrieved by the sequencer 23 from section 213 of the database 21, are false positive strings that have been previously acquired. With this measure, the rate of false positives can be reduced further.

For each candidate malicious code signature 420, which is comprised of one or more of the unique substrings, a fourth step estimates a probability of an occurrence of the candidate malicious code signature 420 within the further sequences of bytes or false alarms obtained from section 213 of the database 21, representing the "false positive probability" for the candidate signature 420.

In a fifth step, one or more of the "best" candidate signatures 420 are selected as valid, where the merit of a signature 420 increases with decreasing false positive probability, and may also depend on other criteria. A signature 420 will be accepted as valid if its estimated false positive probability is less than a threshold probability. The threshold probability is chosen such that it is low enough to reject signatures which might produce too many false positives, but high enough to ensure that at least some candidate signatures 420 will be accepted.

Either periodically or when available, new signatures 420 stored in section 214 of the database 21 are then distributed to monitored systems, such as clients A, B, C, . . . and/or network security devices, such as network filters and knowledge based intrusion detection systems connected to the response server 20. Malicious code strings 41 that were directly stored in the pattern filter 13 may therefore be replaced by new sets of signatures 420 provided by the response server 20.

The process of assembling sets 410 of malicious code strings 410 and evaluating corresponding signatures 420 may be performed with new malicious code strings 410 only, with new malicious code strings 410 in conjunction with the signatures 420 currently stored in section 214 of the database 21 and/or in conjunction with previously acquired malicious code strings 410 that were processed at least once before.

Examples of the present invention ensure that the collection of signatures 420 does not grow larger than necessary if the network is attacked by a plurality of similar, but not identical malicious code strings 41. This results on the one hand in reduced requirements of system resources, in particular memory space, and on the other hand in shorter cycles when scanning for malicious code strings 41.

In summary, described herein by way of examples of the present invention are a method and apparatus for facilitating reduction in successful attacks on a monitored data processing system, such as a host computer. In a described implementation in the present invention, an intrusion detection system comprises a host or application based sensor (14) for detecting code based intrusions with a relatively low false-positive rate. Malicious code strings (41) related to a detected intrusion are identified, extracted and forwarded to a pattern filter (13) located in the monitored data processing system (10) to prevent further intrusions using said malicious code strings (41). The malicious code strings (41) may additionally or alternatively be forwarded to a response server (20) for assembling sets (410) of similar malicious code strings (41) for which signatures (420) are generated to permit identification of all malicious code strings (41) contained in a set (410). The generated signatures (420) are then distributed to monitored and/or monitoring systems of a protected network to prevent further intrusions using said malicious code strings (41) and variations thereof.

What has been described above is merely illustrative of the application of the principles of the present invention. Other arrangements can be implemented by those skilled in the art without departing from the spirit and scope of protection of the present invention.

The present invention is applicable to various data processing systems in which code based attacks, buffer overflow attacks or others, may occur. The present invention is neither limited to the architecture of the described system nor to the programs implemented. Those skilled in the art may also choose different models for the implemented behaviour-based intrusion detection system as well as different algorithms for the correlation of malicious code strings 41 and the evaluation of signatures 420. The term daemon is chosen for all programs that may generate system calls, accept external input and thus create a potential vulnerability, which may be exploited by an attacker.

The invention claimed is:

1. A method for preventing attacks in a monitored data processing system comprising the steps of:

detecting an intrusion into the data processing system by monitoring system calls from a daemon executed in a memory of the monitored data processing system;

upon detection of an intrusion, identifying a malicious code string related to the detected intrusion by matching the system calls with one or more of established patterns and rules contained in a pattern matcher and representing a model of normal behaviour, wherein the matching of the system calls comprises establishing a non-deterministic automaton based on an analysis of executable code of the daemon;

extracting the malicious code string by the steps of:
  intercepting the system call via a subprogram of the sensor for observing the interaction of the daemon and the operating system;
  inspecting a stack upon detection of an intrusion to retrieve an address leading to the malicious code string;
  locating, as a first element on the stack, a return address of a system call entry code from which the subprogram departed; and
  retrieving a return address of the malicious code string pointing to a memory location in the range in which the daemon is executed from a second element on the stack positioned at or near the location of the return address of the system call entry code to facilitate finding and extracting of the malicious code string;
  scanning the memory range owned by the executed daemon starting from the return address in opposite directions until on one side a first region with a plurality of similar addresses and on the other side a second region with a plurality of similar instructions that do not alter the sequential control flow is identified; and
  extracting the malicious code string from between the first and second regions;

forwarding the malicious code string to an intrusion limitation subsystem to reduce further intrusions based on the malicious code string.

2. The method as claimed in claim 1, wherein the intrusion limitation subsystem comprises a pattern filter in the monitored system, and wherein said pattern filter compares incoming strings to the malicious code string for reducing further intrusions based on the malicious code string.

3. A computer program element comprising computer program code means stored on a computer readable medium which, when loaded in a processor of a data processing system, configures the processor to perform a method for preventing attacks in a monitored data processing system comprising the steps of:

detecting an intrusion into the data processing system by monitoring system calls from a daemon executed in a memory of the monitored data processing system;

upon detection of an intrusion, identifying a malicious code string related to the detected intrusion by matching the system calls with one or more of established patterns and rules contained in a pattern matcher and representing a model of normal behaviour, wherein the matching of the system calls comprises establishing a non-deterministic automaton based on an analysis of executable code of the daemon;

extracting the malicious code string by the steps of:
  intercepting the system call via a subprogram of the sensor for observing the interaction of the daemon and the operating system;

inspecting a stack upon detection of an intrusion to retrieve an address leading to the malicious code string;

locating, as a first element on the stack, a return address of a system call entry code from which the subprogram departed; and retrieving a return address of the malicious code string pointing to a memory location in the range in which the daemon is executed from a second element on the stack positioned at or near the location of the return address of the system call entry code to facilitate finding and extracting of the malicious code string;

scanning the memory range owned by the executed daemon starting from the return address in opposite directions until on one side a first region with a plurality of similar addresses and on the other side a second region with a plurality of similar instructions that do not alter the sequential control flow is identified; and extracting the malicious code string from between the first and second regions;

forwarding the malicious code string to an intrusion limitation subsystem to reduce further intrusions based on the malicious code string.

4. Apparatus for preventing attacks in a monitored data processing system comprising:

a monitoring component for monitoring system calls to detect an intrusion by monitoring system calls from a daemon executed in a memory of the monitored data processing system;

a code extractor for identifying and extracting a malicious code string associated with a detected intrusion identifying a malicious code string related to the detected intrusion by matching the system calls with one or more of established patterns and rules contained in a pattern matcher and representing a model of normal behaviour, wherein the matching of the system calls comprises establishing a non-deterministic automaton based on an analysis of executable code of the daemon; and by extracting the malicious code string by the steps of:

intercepting the system call via a subprogram of the sensor for observing the interaction of the daemon and the operating system;

inspecting a stack upon detection of an intrusion to retrieve an address leading to the malicious code string;

locating, as a first element on the stack, a return address of a system call entry code from which the subprogram departed; and retrieving a return address of the malicious code string pointing to a memory location in the range in which the daemon is executed from a second element on the stack positioned at or near the location of the return address of the system call entry code to facilitate finding and extracting of the malicious code string;

scanning the memory range owned by the executed daemon starting from the return address in opposite directions until on one side a first region with a plurality of similar addresses and on the other side a second region with a plurality of similar instructions that do not alter the sequential control flow is identified; and extracting the malicious code string from between the first and second regions; and an intrusion limitation subsystem for reducing further intrusions based on the malicious code string on receipt of the malicious code string from the code extractor.

5. The apparatus as claimed in claim 4, wherein the intrusion limitation subsystem comprises a response server comprising:

a database for receiving extracted malicious code strings from the code extractor;

a correlator connected to the database for assembling sets of code strings having mutual edit distances less than a given threshold distance;

a sequencer connected to the database for generating signatures, wherein a signature is generated for each set to facilitate identification of all malicious code strings contained in the corresponding set; and a distributor connected to the database for distributing signatures to connected systems.

6. The computer program element as recited in claim 3 wherein said method further comprises:

storing each malicious code string extracted in a database of the response server;

correlating the stored malicious code strings to find sets of malicious code strings; and for each set, generating a signature that allows the individual identification of all malicious code strings contained in the corresponding set; and forwarding the malicious code string to an intrusion limitation subsystem to reduce further intrusions based on the malicious code string wherein the intrusion limitation subsystem comprises a response server and wherein said response server distributes the malicious code string to one or more connected systems to reduce further intrusions into such connected systems based on the malicious code string.

7. The method as claimed in claim 1 further comprising the steps of:

storing each malicious code string extracted in a database of the response server;

correlating the stored malicious code strings to find sets of malicious code strings; and for each set, generating a signature that allows the individual identification of all malicious code strings contained in the corresponding set; and forwarding the malicious code string to an intrusion limitation subsystem to reduce further intrusions based on the malicious code string wherein the intrusion limitation subsystem comprises a response server and wherein said response server distributes the malicious code string to one or more connected systems to reduce further intrusions into such connected systems based on the malicious code string.

* * * * *